United States Patent [19]

Yamamoto

[11] Patent Number: 6,065,287
[45] Date of Patent: May 23, 2000

[54] TORQUE CONVERTER STATOR WITH PROJECTION OR RECESSION IN THICKNESS

[75] Inventor: Takeshi Yamamoto, Fuji, Japan

[73] Assignee: Jatco Corporation, Fuji, Japan

[21] Appl. No.: 09/110,951

[22] Filed: Jul. 7, 1998

[30] Foreign Application Priority Data

Jul. 7, 1997 [JP] Japan ................................ 9-181481

[51] Int. Cl.⁷ .................................................. F16D 33/20
[52] U.S. Cl. .............................. 60/361; 60/362; 415/191; 416/180; 416/197 C
[58] Field of Search .................... 60/361, 362; 415/191, 415/186, 188, 208.2, 208.3, 208.5, 211.1, 211.2; 416/180, 197 C

[56] References Cited

U.S. PATENT DOCUMENTS

| | | | |
|---|---|---|---|
| 3,192,719 | 7/1965 | Kronogard | 60/361 |
| 4,608,823 | 9/1986 | Maze | 60/361 |
| 5,005,356 | 4/1991 | Saunders | 416/180 |
| 5,836,157 | 11/1998 | Kosuge | 60/362 |

FOREIGN PATENT DOCUMENTS

| | | |
|---|---|---|
| 7-44841 | 10/1995 | Japan . |
| 7-44881 | 11/1995 | Japan . |
| 8-270749 | 10/1996 | Japan . |

*Primary Examiner*—Christopher Verdier
*Attorney, Agent, or Firm*—Jacobson, Price, Holman & Stern, PLLC

[57] ABSTRACT

Stator structure is provided which is capable of suppressing an increase in fluid sound while maintaining high driving force transmission efficiency. The stator structure is disposed between the turbine runner and pump impeller of a torque converter and is provided with a plurality of circumferential vane portions for increasing torque which is input to the automatic transmission by employing reaction force produced when a flow of oil within the torque converter is abutted in a stall state. Rib portions for rectifying a flow of abutted oil are formed on the exterior surface of the vane portion.

6 Claims, 13 Drawing Sheets

TORQUE CONVERTER STATOR WITH PROJECTION OR RECESSION IN THICKNESS

BACKGROUND OF THE INVENTION

1. Field of the Invention

This invention relates to stator structure provided chiefly within the torque converter of an automatic transmission which is employed in controlling the transmission of the driving force of a vehicle.

2. Description of the Related Art

As this kind of conventional stator structure, one employed in the torque converter 2 of an automatic transmission 1, such as that shown in FIGS. 15 through 19, is known.

Figure 15:
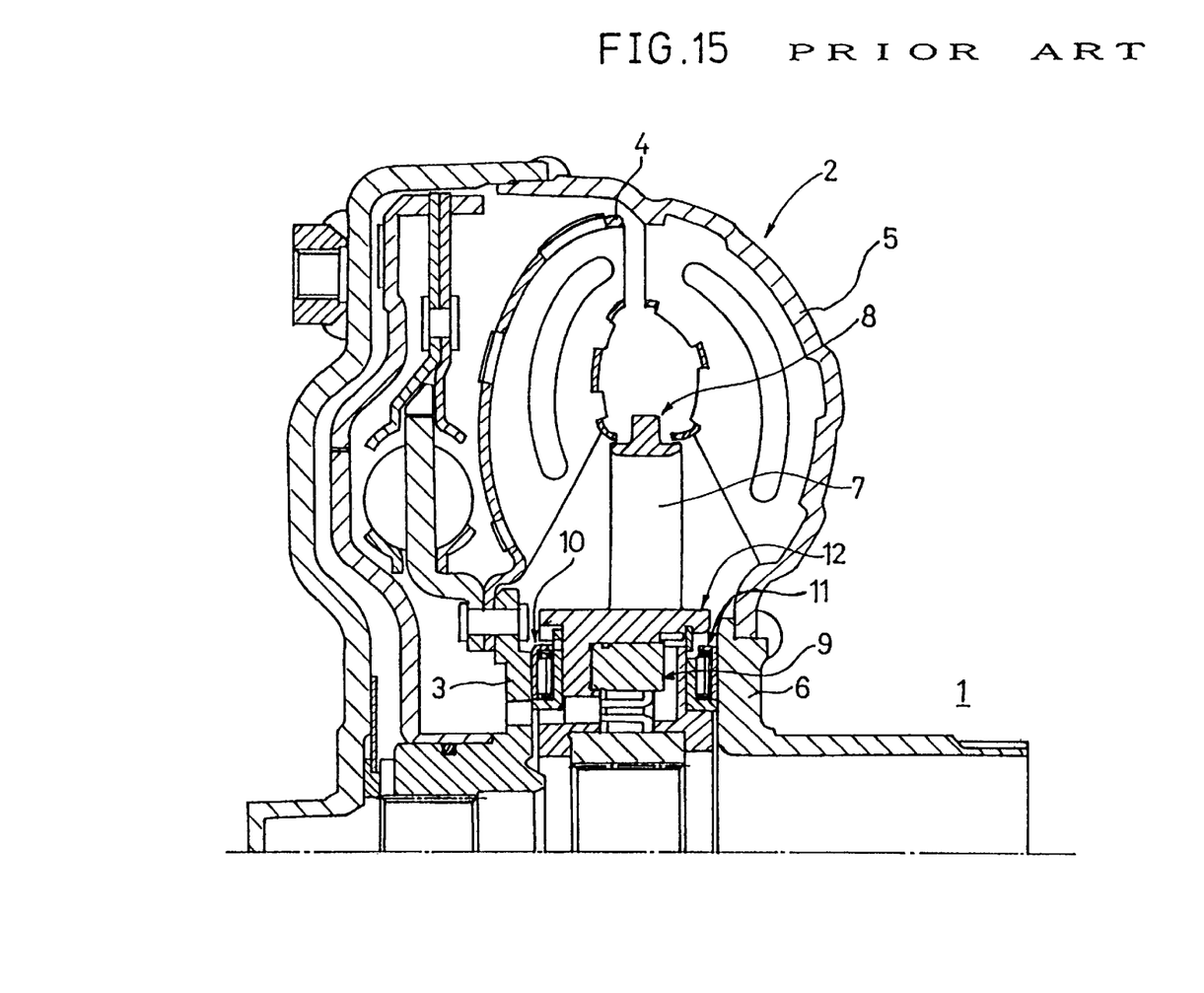
FIG. 15 is a longitudinal sectional view showing a conventional stator structure installed in the torque converter of an automatic transmission.

Within such a torque converter 2, as shown in FIG. 15, a turbine runner 4 is provided and firmly attached to a turbine hub 3 provided so that it is free to rotate.

In this torque converter 2, a pump impeller 5 is provided in opposition to this turbine runner 4 and is firmly attached to a drive sleeve 6.

And between the turbine runner 4 and the drive sleeve 6, there is interposed a stator 8 provided with a plurality of circumferential vane portions 7.

This stator 8 is axially supported on the input shaft of the automatic transmission through a one-way clutch 9, and the front and rear end surfaces of the proximal portion 12 of the stator are contacted with the turbine hub 3 and the drive sleeve 6 through thrust bearings 10 and 11, whereby the stator 8 is allowed to rotate only in one direction and supported so that it is rotatable.

Figure 17:
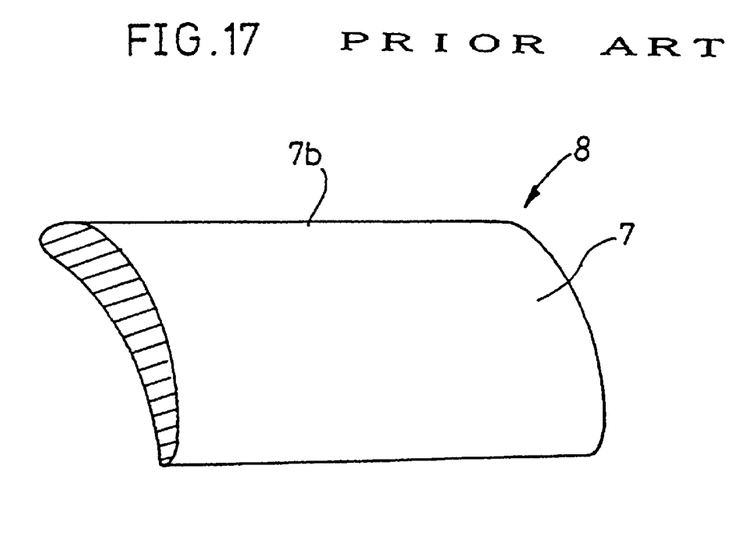
FIG. 17 is a perspective view showing the vane portion of the conventional stator structure.

The vane portion 7 of this stator 8, as shown in FIG. 17, is constituted so that the sectional configuration presents a streamline shape, in order to increase a torque which is input to this automatic transmission 1 by employing reaction force which is produced when the flow of oil within the torque converter 2 is abutted in a stall state.

Figure 18:
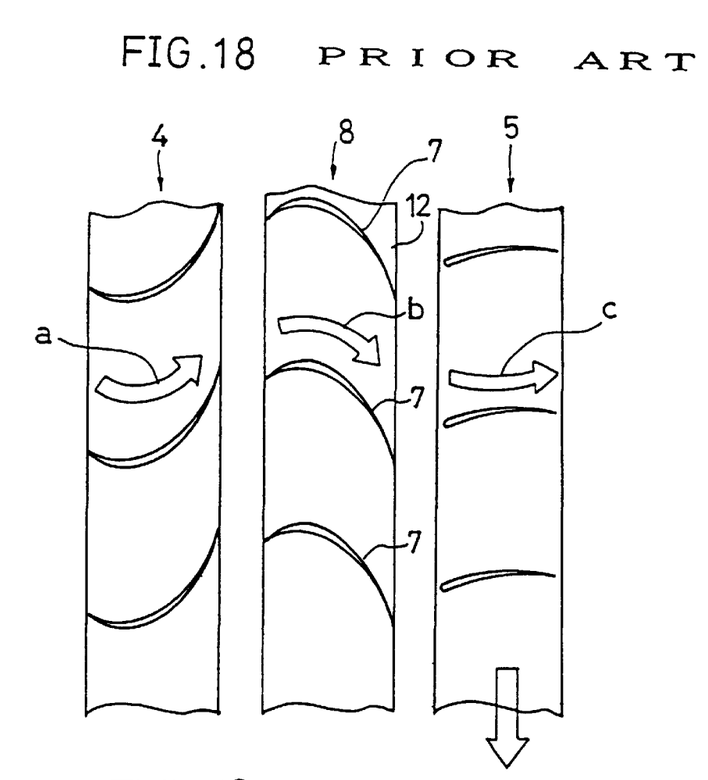
FIG. 18 is a schematic view for describing the flow of oil in the conventional stator structure.

That is, as schematically shown in FIG. 18, with rotation of the pump impeller 5, the turbine runner 4 is given turning force by an oil flow a coming into this turbine runner 4.

And an oil flow b going out from this turbine runner 4 is inverted in a stall state (in which revolution speed of pump impeller 5>>revolution speed of turbine runner 4) by the vane portions 7 of the stator 8 and forms a flow c which joins the flow a.

For this reason, if the torque of the pump impeller 5 is taken to be T1, the transmission torque to the turbine runner 4 to be T2, and the reaction force of the stator 8 to be T3, T2 becomes T1+T3 (i.e., T2=T1+T3). Therefore, the reaction force produced by the flow b abutting on the vane portions 7 is employed, and the torque T2 which is input to the automatic transmission 1 is increased.

Also, if the revolution speed of the turbine runner 4 reaches more than a predetermined value, the direction of the oil flow a going out from the turbine runner 4 will be varied gradually and hit on the back surface side 7a of the vane portion 7.

At this time, the stator 8 is constituted so that it races by operation of the one-way clutch 9 and does not disturb the oil flow b.

Therefore, in the fluid coupling area (where revolution speed of pump impeller 5 is substantially equal to revolution speed of turbine runner 4), oil flows smoothly along the configuration of the vane portions 7.

In Japanese Utility Model Publication No. B7-44,841, there is described a stator 8 with large and small vane portions 7 alternately provided so that flow disturbance due to the revolution speed can be rectified.

In such conventional stator structure, there is known a method which thins the sectional configuration of the vane portion 7 to increase the oil passage area between the vane portions 7 and 7, in order to transmit driving force efficiently to the output side by making the coupling point of the torque converter 2 a higher speed ratio to suppress slippage as much as possible.

However, if the vane portion 7 is thus thinned, the torque capacity will increase and therefore loss of heat in the stall state will increase.

Figure 19:
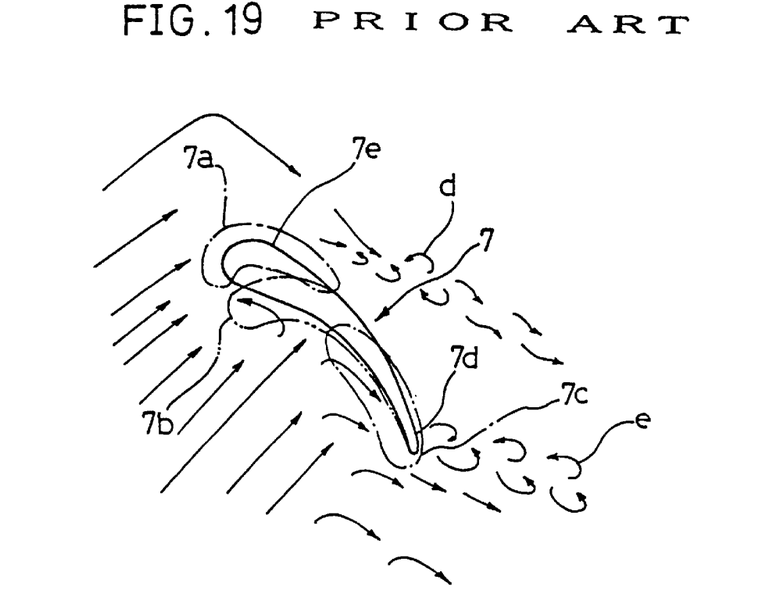
FIG. 19 is a schematic view for describing the occurrence state of vortexes in the vane portion of the conventional stator structure.

Hence, as shown by the alternate long and two short dashed line in FIG. 19, the point edge 7b near the inlet of the vane portion is curved downward, and a tuning operation for separating an oil flow d purposely at the back surface side of the upper inlet portion is performed.

However, the problem is that the oil separated from the back surface side 7e of the upper inlet portion by such a tuning operation will be vortical and will increase fluid sound along with separated vortexes of oil also arising at the back surface side near the exit 7c.

SUMMARY OF THE INVENTION

Accordingly, an object of the present invention is to provide stator structure which is capable of suppressing an increase in fluid sound, while maintaining high driving force transmission efficiency.

To achieve this end, the stator structure according to one aspect of the present invention is characterized in that in stator structure which is disposed between the turbine runner and pump impeller of a torque converter and also which is provided with a plurality of circumferential vane portions for increasing torque which is input to the automatic transmission by employing reaction force produced when a flow of oil within the torque converter is abutted in a stall state, an irregularity portion for rectifying a flow of abutted oil is formed on an exterior surface of the vane portion.

With such constitution, the vane portions employ reaction force produced when a flow of oil within the torque converter is abutted in a stall state, and when torque which is input to the automatic transmission is increased, the flow of the abutted oil is rectified by the irregularity portion formed on the exterior surface of the vane portion.

For this reason, there is no possibility that the stator structure will be influenced by thinning or curving the vane portion, and the occurrence of separated vortexes is reduced and therefore an increase in the fluid sound is suppressed.

Also, the stator structure is characterized in that the irregularity portion is a rib portion extended near an exit portion of the vane portion substantially along a tangential direction of an exterior circumference of the vane portion.

With such constitution, the rib portion is extended near the exit portion of the vane portion substantially along the tangential direction of the exterior circumference of the vane portion, so oil abutting on the vane portion is rectified by the rib portion. As a consequence, oil separation which occurs on the back surface side near the exit portion is suppressed.

In addition, the stator structure is characterized in that the irregularity portion is a groove extended near an exit portion of the vane portion substantially along a tangential direction of an exterior circumference of the vane portion.

With such constitution, the groove is extended near the exit portion of the vane portion substantially along the tangential direction of the exterior circumference of the vane portion, so oil abutting on the vane portion is rectified by the groove. As a consequence, oil separation which occurs on the back surface side near the exit portion is suppressed.

Furthermore, the stator structure is characterized in that the extending direction of the irregularity portion is substantially radial.

With such constitution, the extending direction of the irregularity portion is substantially radial, so there is no possibility that the flow of oil circulating between the turbine runner and the pump impeller will be disturbed. As a consequence, the efficiency of the torque converter can be further enhanced.

Furthermore, the stator structure is characterized in that the irregularity portion is a rib portion extended near an inlet portion of the vane portion substantially along a tangential direction of an exterior circumference of the vane portion.

With such constitution, the rib portion is extended near the inlet portion of the vane portion substantially along the tangential direction of the exterior circumference of the vane portion, so oil abutting on the vane portion is rectified by the rib portion. As a consequence, oil separation which occurs on the back surface side near the inlet portion is suppressed.

Moreover, the stator structure is characterized in that the irregularity portion is a groove extended near an inlet portion of the vane portion substantially along a tangential direction of an exterior circumference of the vane portion.

With such constitution, the groove is extended near the inlet portion of the vane portion substantially along the tangential direction of the exterior circumference of the vane portion, so oil abutting on the vane portion is rectified by the groove. As a consequence, oil separation which occurs on the back surface side near the inlet portion is suppressed.

BRIEF DESCRIPTION OF THE DRAWINGS

The present invention will be described in further detail with reference to the accompanying drawings in which.

DETAILED DESCRIPTION OF THE PREFERRED EMBODIMENTS

Embodiments of the present invention will hereinafter be described in reference to the drawings. For the same parts as the conventional stator structure shown in FIGS. 15 through 19 or corresponding parts, a description will be made with the same reference numerals.

FIGS. 1 through 4 show the stator structure of a first embodiment of this invention.

Figure 1:
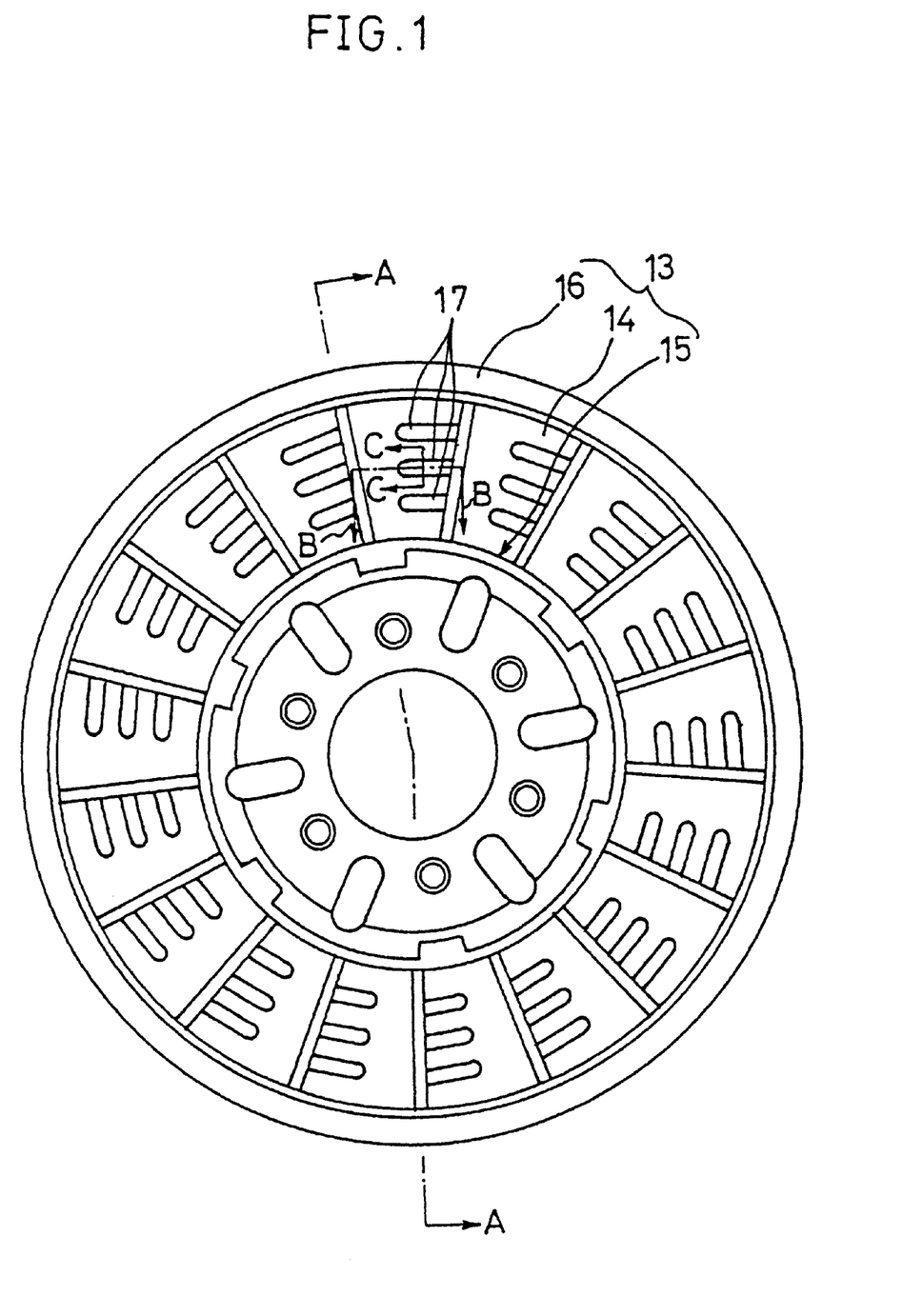
FIG. 1 is a front view showing the stator structure of a first embodiment of the present invention.
Figure 2:
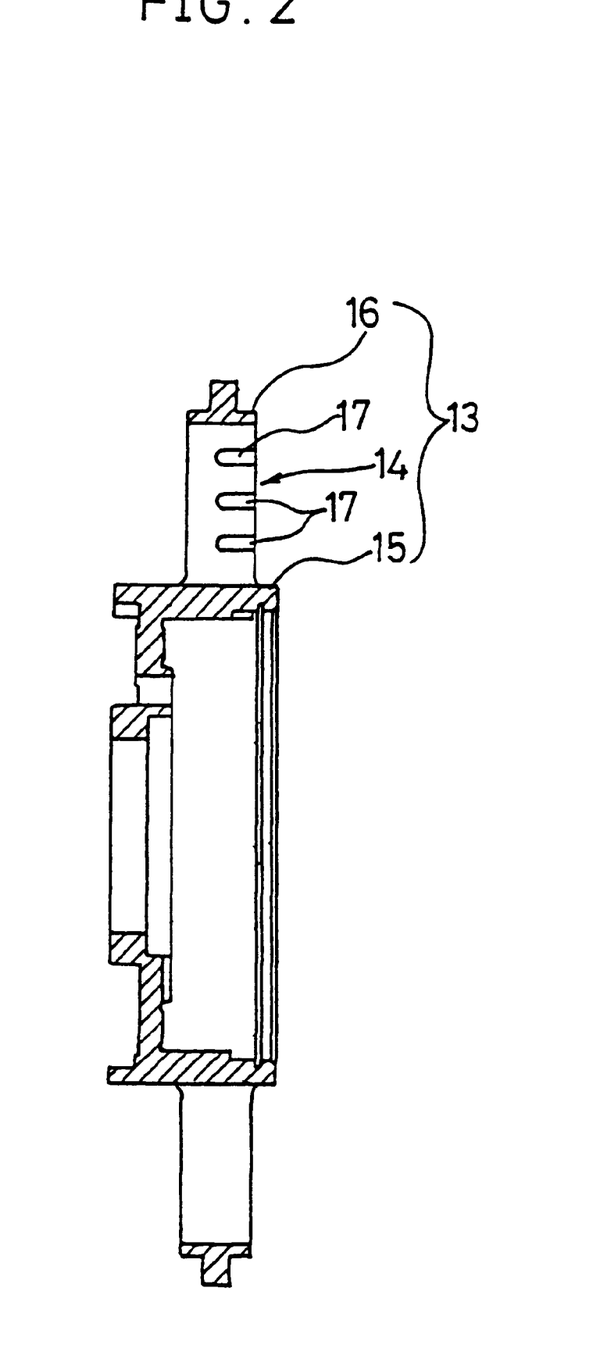
FIG. 2 is a sectional view, taken along the line A—A of FIG. 1, showing the stator structure of the first embodiment.

First, the constitution will be described. In the stator structure of the first embodiment, a stator 13 is interposed between the turbine runner and pump impeller of a torque converter.

This stator 13 is provided with a plurality of circumferential vane portions 14. The circumferential vane portions 14 are used to increase torque which is input to the automatic transmission by employing reaction force which is produced when a flow of oil within the torque converter is abutted. The circumferential vane portions 14 are provided radially on the circumference of the boss portion 15 of the stator 13.

Furthermore, on the outer circumferential ends of these vane portions 14, an outer circumferential ring portion 16 is provided so as to become integral with them.

On an oil abutting front surface side 14a near the exit which is the exterior surface of each of these vane portions 14, three rib portions 17 as an irregularity portion for rectifying a flow of abutted oil are provided substantially along the tangential direction of the exterior circumference of the vane portion 14.

Figure 3:
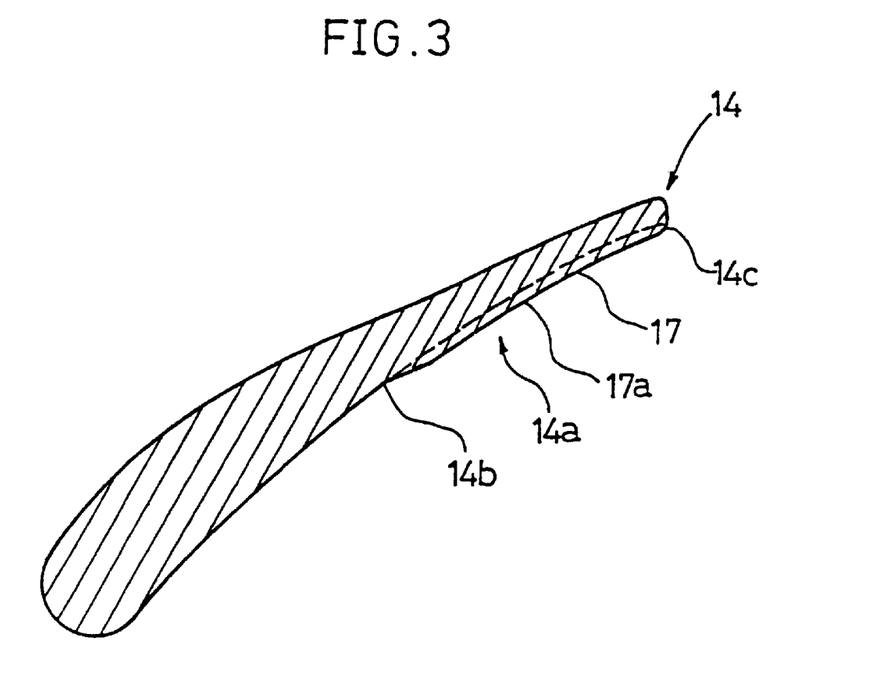
FIG. 3 is a sectional view, taken along the line B—B of FIG. 1, showing the stator structure of the first embodiment.

The rib portions 17, as shown in FIG. 3, are respectively extended from approximately the center portion 14b of the front surface side 14a toward the rear end portion 14c of the front surface side 14a and are formed so as to become substantially parallel with one another.

Figure 4:
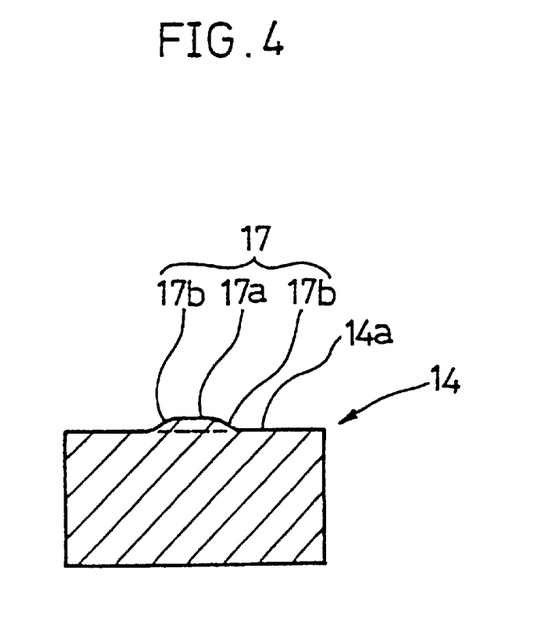
FIG. 4 is a sectional view, taken along the line C—C of FIG. 1, showing the stator structure of the first embodiment.

Also, as shown in FIG. 4, on both side edges of a flat top portion 17a formed so as to become substantially parallel to the aforementioned front surface side 14a of this rib portion 17, inclined portions 17b and 17b for connecting the other front surface sides 14a and this top portion 17a smoothly are formed.

Next, a description will be made of the operation of the first embodiment of the present invention.

In a so-called fluid coupling area where the revolution speed of the aforementioned pump impeller 5 approaches the revolution speed of the turbine runner 4, oil flows smoothly along the shapes of the vane portions 14 of the stator 13.

In a nearly similar way to the state shown in FIG. 18, in a so-called torque converter area where the revolution speed of the pump impeller 5 becomes greater than that of the turbine runner 4, an oil flow b is inverted by the vane portions 14 of the aforementioned stator 13, again goes toward the pump impeller 5, and forms a flow c which joins the aforementioned flow a.

For this reason, if the torque of the pump impeller 5 is taken to be T1, the transmission torque to the turbine runner 4 to be T2, and the reaction force of the stator 13 to be T3, T2 becomes T1+T3 (i.e., T2=T1+T3). Therefore, the reaction force produced by the flow b abutting against the vane portions 14 is employed, and the torque T2 which is input to the automatic transmission 1 is increased.

In such a torque converter area, the torque which is input to the automatic transmission is increased by employing the reaction force produced when the oil flow within the aforementioned torque converter is abutted, and also the flow b of the abutted oil is rectified by the rib portions 17 formed on the exterior surface of the vane portion 14.

For this reason, there is no possibility that the stator structure according to the first embodiment will be influenced by thinning or curving the vane portion 14, and the occurrence of separated vortexes is reduced and therefore an increase in the fluid sound is suppressed.

In addition, the irregularity portion of the first embodiment is the rib portions 17 extended near the rear end portion 14c of the exit portion of the aforementioned vane portion 14 substantially along the tangential direction of the exterior circumferential of the vane portion 14. Therefore, the vane portion 14 is reinforced and presents high rigidity by these rib portions 17.

For this reason, there is no possibility that there will be a loss in the rigidity even by thinning the vane portion 14, and the oil passage area between the vane portions 14 and 14 can be increased.

Therefore, an increase in the fluid sound can be suppressed, while the high driving force transmission efficiency is being maintained.

Next, the effect of suppressing an increase in the fluid sound will be described with measured values obtained by experiment.

Figure 16:
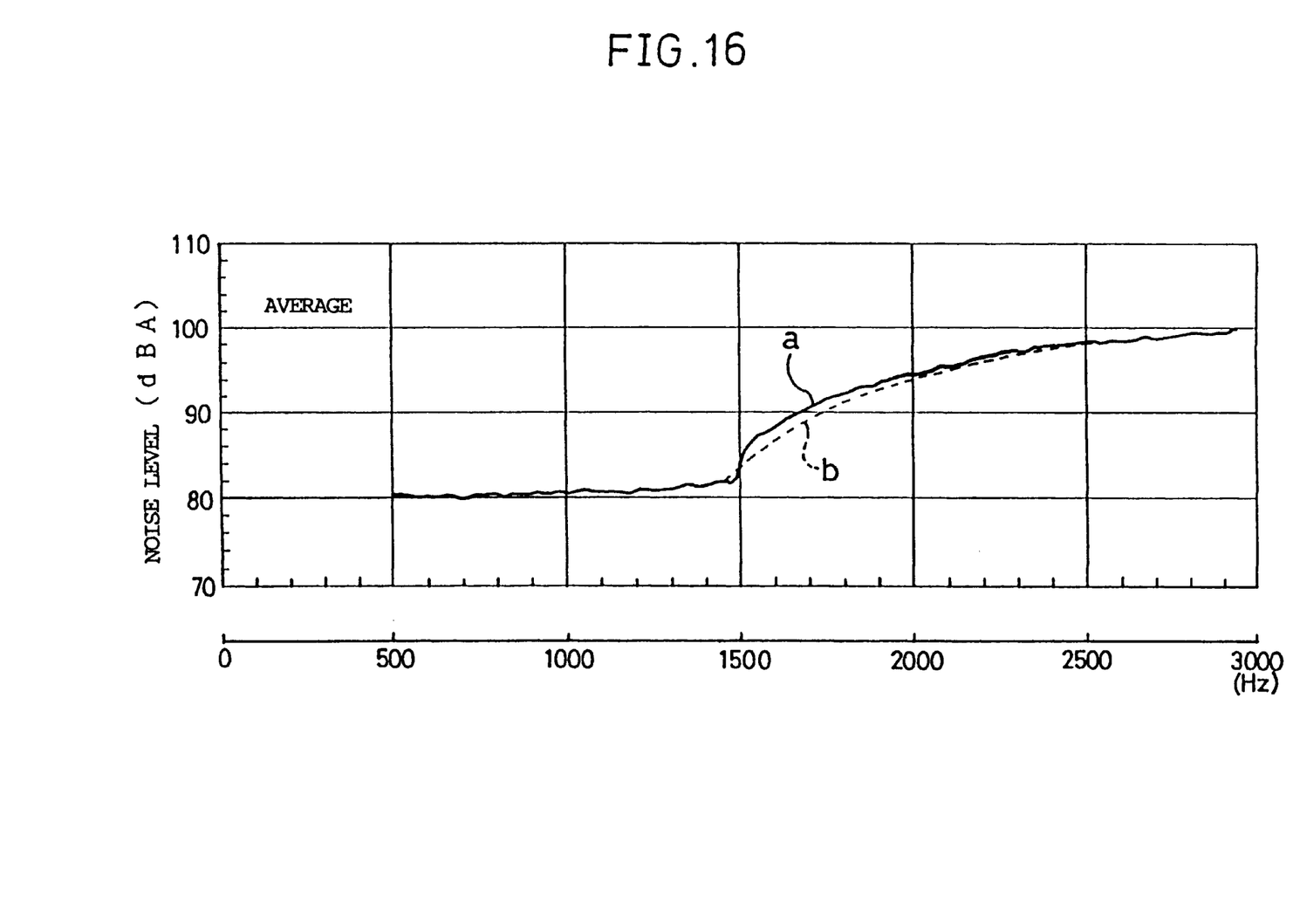
FIG. 16 is a graph showing the sound vibration characteristics of the stator structure of the present invention and conventional stator structure.

FIG. 16 shows the noise level plotted against the difference in revolution speed between the pump impeller 5 and the turbine runner 4 during a stall.

For the experimental conditions, the input revolution speed is 0 to 3000 rpm (sweep) and the output revolution speed is 0 rpm (fixed), thereby reproducing a stall state. At this time, the distance from the torque converter to a microphone is 300 mm. For the analyzing method, a tracking analysis was performed in the overall range of 0 to 5000 Hz.

In FIG. 16 plotting the experimental results obtained in this manner, the noise of a torque converter having a conventional stator is represented by a solid line a, and the noise of a torque converter having the stator 13 provided with the irregularity portion of the present invention is represented by a broken line b.

From FIG. 16 it is found that in a range from about 1500 Hz to about 2500 Hz, noise b including fluid sound which arises from the torque converter having the stator 13 of the present invention is less than noise a including fluid sound which arises from the torque converter having the conventional stator.

Note in FIG. 16 that the noise in a range less than 1500 Hz is noise arising from laboratory equipment.

Also, a range greater than 2500 Hz is a range where fluid sound does not matter so much, because engine noise becomes great.

FIGS. 5 through 8 show the stator structure of a second embodiment of this invention. For the same parts as the aforementioned first embodiment or corresponding parts, a description will be made with the same reference numerals.

Figure 5:
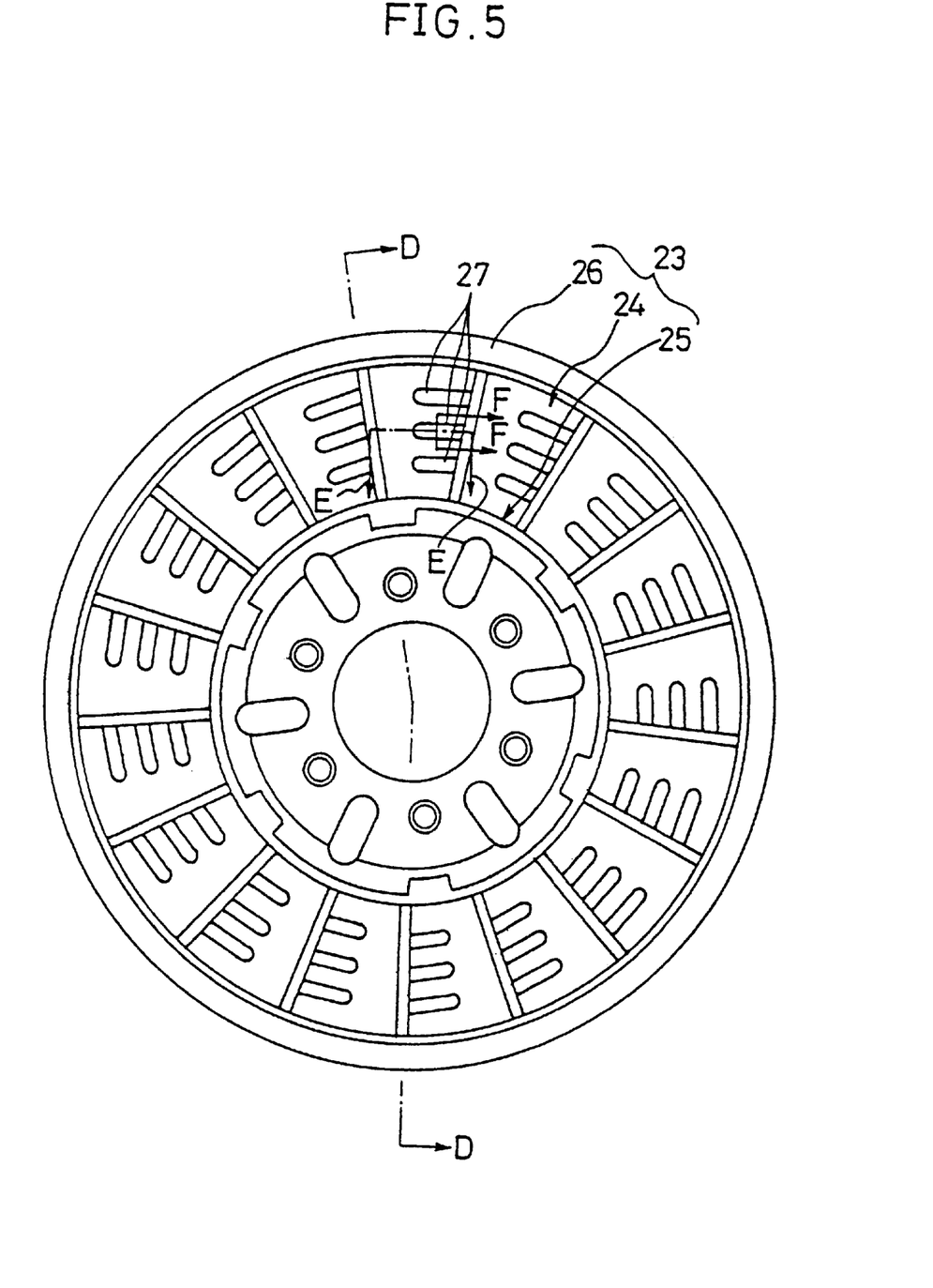
FIG. 5 is a front view showing the stator structure of a second embodiment of the present invention.
Figure 6:
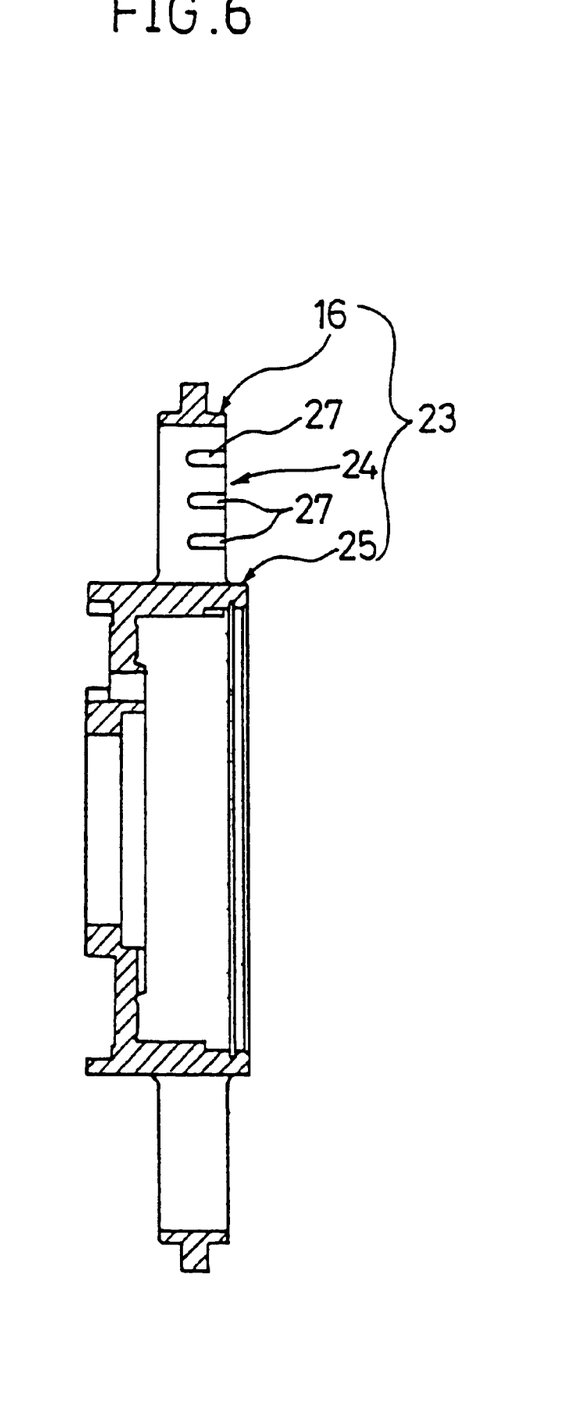
FIG. 6 is a sectional view, taken along the line D—D of FIG. 5, showing the stator structure of the second embodiment.

In the stator structure of the second embodiment, a stator 23 is provided with a plurality of circumferential vane portions 24. The circumferential vane portions 24 increase torque which is input to the automatic transmission by employing reaction force which is produced when a flow of oil within the aforementioned torque converter is abutted in a stall state. The circumferential vane portions 24 are provided radially on the circumference of the boss portion 25 of the stator 23.

Furthermore, on the outer circumferential ends of these vane portions 24, an outer circumferential ring portion 26 is provided so as to become integral with them.

On an oil abutting front surface side 24a near the exit which is the exterior surface of each of these vane portions 24, three grooves 27 as an irregularity portion for rectifying a flow of abutted oil are provided substantially along the tangential direction of the exterior circumference of the vane portion 24.

Figure 7:
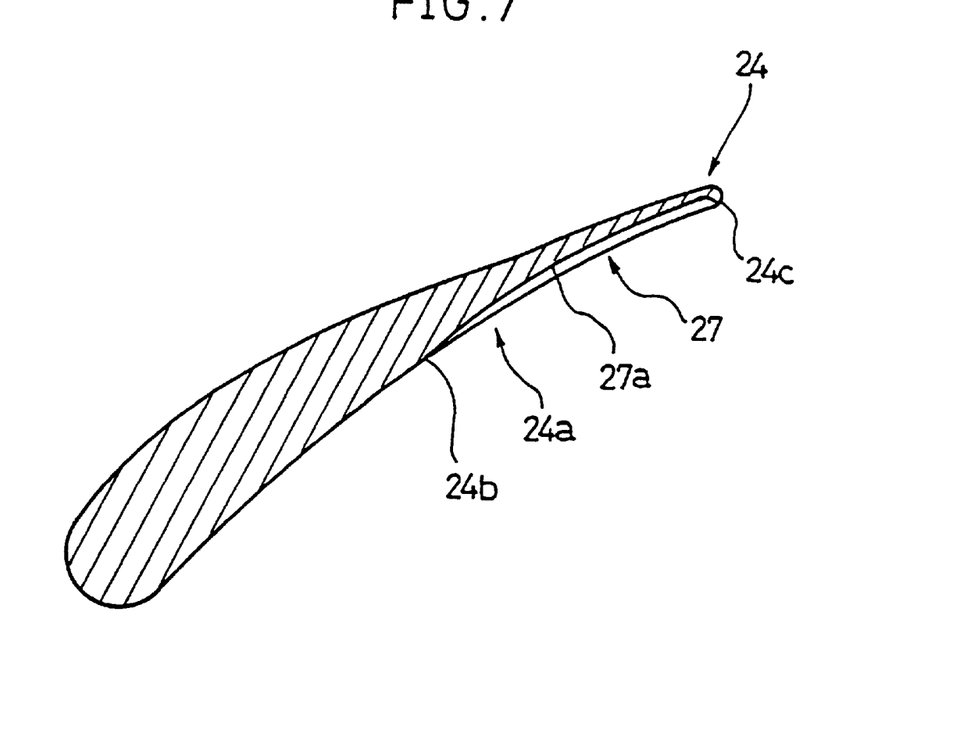
FIG. 7 is a sectional view, taken along the line E—E of FIG. 5, showing the stator structure of the second embodiment.

The grooves 27, as shown in FIG. 7, are respectively extended from approximately the center portion 24b of the front surface side 24a toward the rear end portion 24c of the front surface side 24a and are formed so as to become substantially parallel with one another.

Figure 8:
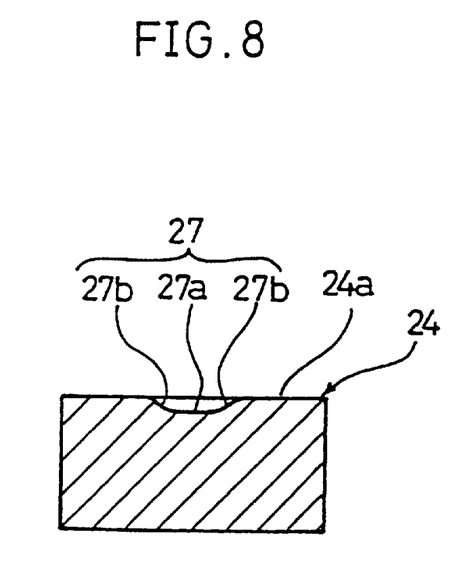
FIG. 8 is a sectional view, taken along the line F—F of FIG. 5, showing the stator structure of the second embodiment.

Also, as shown in FIG. 8, on both side edges of a flat bottom portion 27a formed so as to become substantially parallel to the front surface side 24a of this groove 27, inclined wall portions 27b and 27b for connecting the other front surface sides 24a and this bottom portion 27a smoothly are formed.

Next, a description will be made of the operation of the second embodiment.

In the second embodiment, the torque which is input to the automatic transmission is increased by employing the reaction force produced when a flow of oil within the aforementioned torque converter is abutted in a stall state, and also the flow b of the abutted oil is rectified by the groove portions 27 formed on the exterior surface of the vane portion 24.

For this reason, there is no possibility that the stator structure according to the second embodiment will be influenced by thinning or curving the vane portion 24, and the occurrence of separated vortexes is reduced and therefore an increase in the fluid sound is suppressed.

Since the remaining constitution and operation are substantially identical with the aforementioned first embodiment, a description thereof is omitted.

FIGS. 9 through 12 show the stator structure of a third embodiment of this invention. For the same parts as the aforementioned first and second embodiments or corresponding parts, a description will be made with the same reference numerals.

Figure 9:
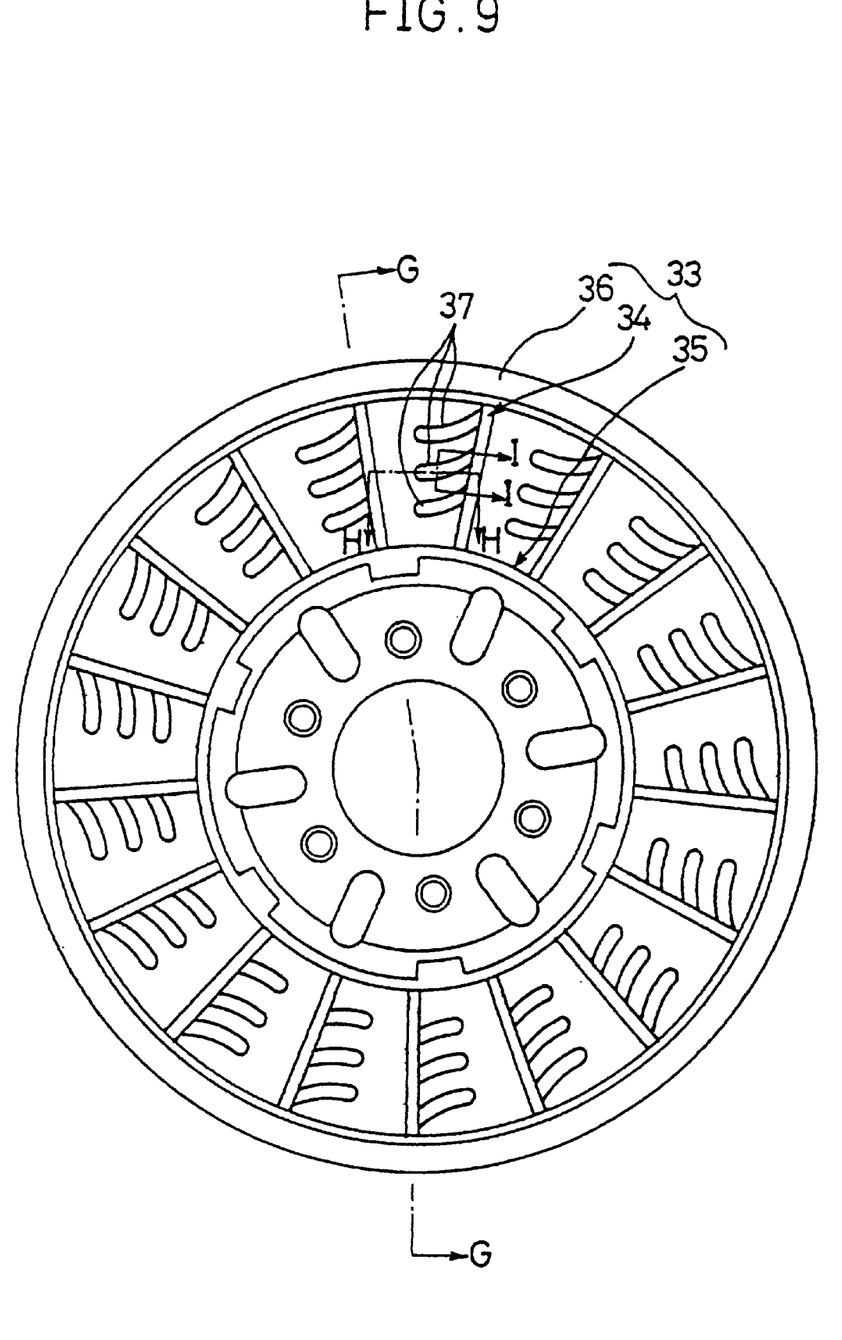
FIG. 9 is a front view showing the stator structure of a third embodiment of the present invention.

In the stator structure of the third embodiment, a stator 33 is provided with a plurality of circumferential vane portions 34. The circumferential vane portions 34 increase torque which is input to the automatic transmission by employing reaction force which is produced when a flow of oil within the aforementioned torque converter is abutted in a stall state. The circumferential vane portions 34 are provided radially on the circumference of the boss portion 35 of the stator 33.

Furthermore, on the outer circumferential ends of these vane portions 34, an outer circumferential ring portion 36 is provided so as to become integral with them.

On an oil abutting front surface side 34a near the exit which is the exterior surface of each of these vane portions 34, three rib portions 37 as one irregularity portion for rectifying a flow of abutted oil are provided substantially along the tangential direction of the exterior circumference of the vane portion 34.

Figure 10:
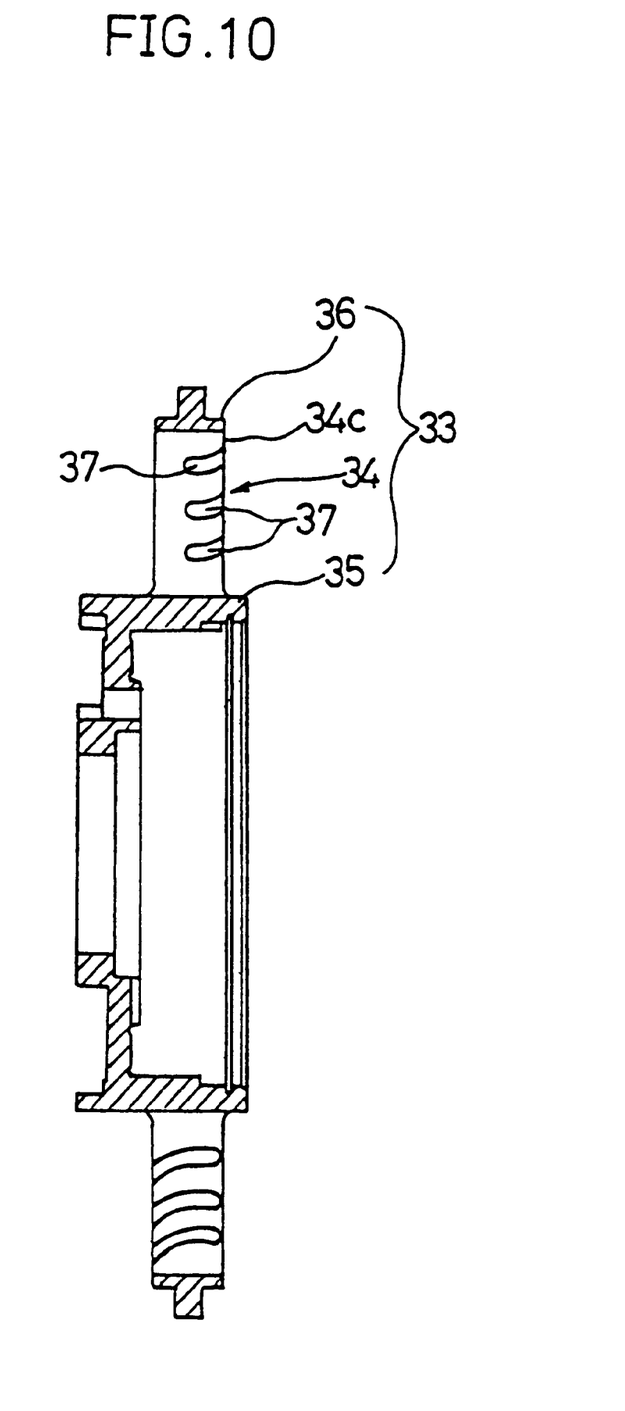
FIG. 10 is a sectional view, taken along the line G—G of FIG. 9, showing the stator structure of the third embodiment.
Figure 11:
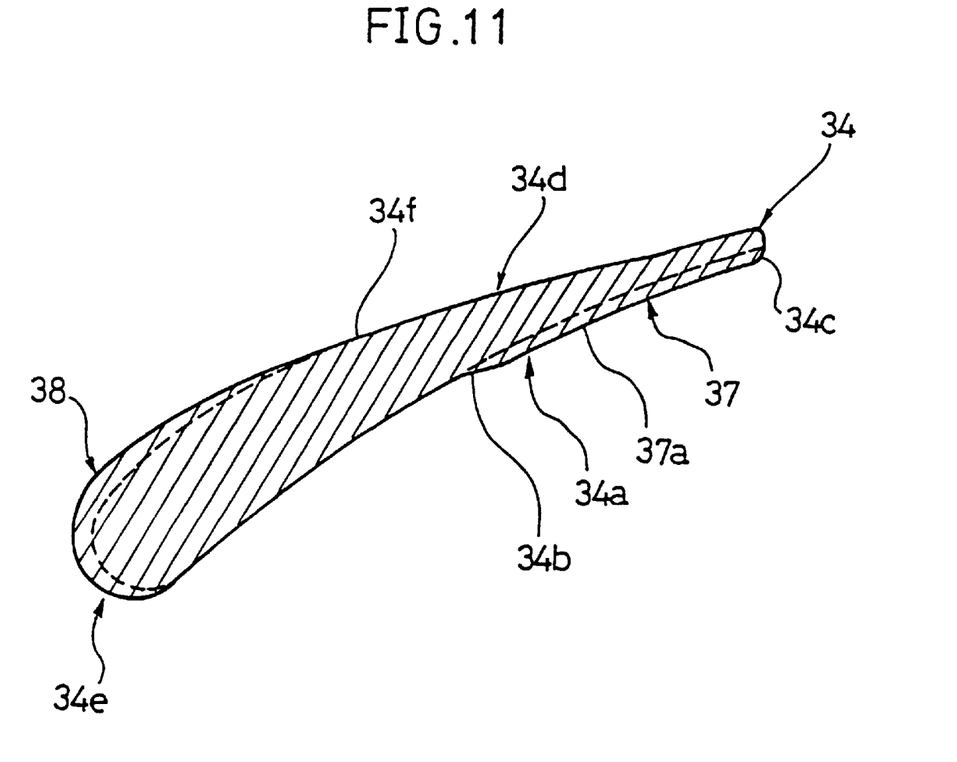
FIG. 11 is a sectional view, taken along the line H—H of FIG. 9, showing the stator structure of the third embodiment.

The rib portions 37, as shown in FIG. 11, are respectively extended from approximately the center portion 34b of the front surface side 34a toward the rear end portion 34c of the front surface side 34a. Furthermore, as shown in FIG. 10, these rib portions 37 are curved and formed in the outer radius direction at the rear end portion 34c of the front surface side 34a so that the extending directions of these rib portions 37 are substantially radial.

Figure 12:
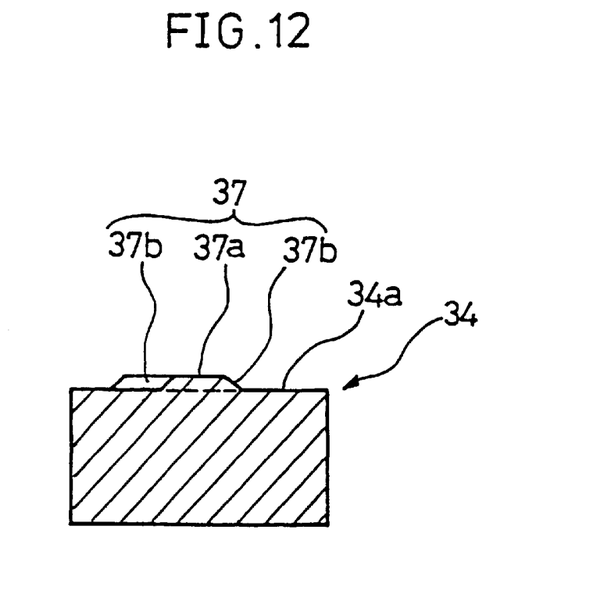
FIG. 12 is a sectional view, taken along the line I—I of FIG. 9, showing the stator structure of the third embodiment.

Also, as shown in FIG. 12, on both side edges of a flat top portion 37a formed so as to become substantially parallel to the aforementioned front surface side 34a of this rib portion 37, inclined wall portions 37b and 37b are formed for connecting the other front surface sides 34a and this top portion 37a smoothly.

Moreover, in the third embodiment, a plurality of rib portions 38 as the other irregularity portion are extended on an oil abutting back surface side 34d near the inlet portion of the vane portion 34 substantially along the tangential direction of the exterior circumference of the vane portion 34.

The rib portions 38, as shown in FIG. 11, are respectively extended from the inlet round portion 34e toward approximately the center portion 34f of the back surface side 34d. Furthermore, as shown in FIG. 11, these rib portions 38 are formed so as to be curved in the outer radius direction at approximately the center portion 34f of the back surface side 34f so that the extending directions of these rib portions 38 are substantially radial.

Next, a description will be made of the operation of the third embodiment.

In the third embodiment, the torque which is input to the automatic transmission is increased by employing the operation of the aforementioned first embodiment and furthermore employing the reaction force produced when a flow of oil within the aforementioned torque converter is abutted in a stall state, and also the flow b of the abutted oil is rectified by the rib portions 37 formed on the exterior surface of the vane portion 34.

At this time, since the extending directions of the aforementioned rib portions 37 and 38 are substantially radial, there is no possibility that the flow of oil circulating between the aforementioned turbine runner and pump impeller will be disturbed.

Therefore, the efficiency of the torque converter can be further enhanced.

For this reason, there is no possibility that the stator structure according to the third embodiment will be influenced by thinning or curving the vane portion 34, and the occurrence of separated vortexes is reduced and therefore an increase in the fluid sound is suppressed.

Since the remaining constitution and operation are substantially identical with the aforementioned first and second embodiments, a description thereof is omitted.

Figure 13:
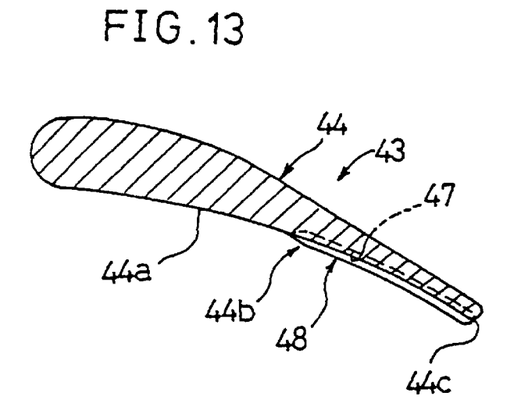
FIG. 13 is a sectional view similar to FIG. 3 showing the stator structure of a fourth embodiment.

FIG. 13 shows a sectional view for describing the stator structure of a fourth embodiment of this invention.

In a stator 43 of the fourth embodiment, on an oil abutting front surface side 44a near the exit which is the exterior surface of each of the vane portions 44, a plurality of grooves 47 as an irregularity portion for rectifying a flow of abutted oil are provided substantially along the tangential direction of the exterior surface of the vane portion 44.

The grooves 47 are respectively extended from the near center portion 44b of the front surface side 44a toward the rear end portion 44c of the front surface side 44a and are formed so as to become substantially parallel with one another.

Between the grooves 47 and 47 formed in this vane portion 44, a plurality of rib portions 48 as an irregularity portion for rectifying a flow of abutted oil are provided substantially along the tangential direction of the exterior circumference of the vane portion 44.

The rib portions 48 are respectively extended from approximately the center portion 44b of the front surface side 44a toward the rear end portion 44c of the front surface side 44a and are formed so as to become substantially parallel with the aforementioned groove 47.

Since the remaining constitution and operation are substantially identical with the aforementioned first through the third embodiments, a description thereof is omitted.

Figure 14:
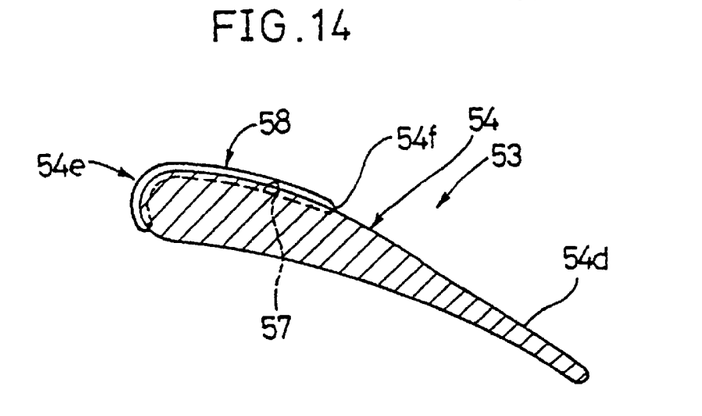
FIG. 14 is a sectional view similar to FIG. 3 showing the stator structure of a fifth embodiment.

FIG. 14 shows a sectional view for describing the stator structure of a fifth embodiment of this invention.

In a stator 53 of the fifth embodiment, a plurality of rib portions 58 as part of the irregularity portion are respectively extended from an inlet round portion 54e of a vane portion 54 toward approximately the center portion 54f of an oil abutting back surface side 54d.

Also, between the rib portions 58 and 58, a plurality of grooves 57 for rectifying a flow of abutted oil are provided from the inlet round portion 54e toward approximately the center portion 54f of the oil abutting back surface side 54d substantially along the tangential direction of the exterior circumference of the vane portion 54.

The grooves 57 are formed so as to become substantially parallel with the aforementioned rib portion 58.

Since the remaining constitution and operation are substantially identical with the aforementioned first through the fourth embodiments, a description thereof is omitted.

While the first through the fifth embodiments of this invention have been fully described by the drawings, the invention is not limited to these embodiments. Such modifications as fall within the gist of this invention are included in the invention.

For example, in the aforementioned first through the fourth embodiments, although it has been described that the rib portion 17 or groove 27 is formed from approximately the center position 14b of the vane portion 14 to the rear end portion 14c, particularly the present invention is not limited to this. For example, the rib portion or groove may be formed substantially over the entire area from the inlet round portion of the oil abutting front surface side 14a to the rear end portion 14c. Also, the rib portion 58 or groove 57 formed on the inlet round portion 54e shown in the aforementioned fifth embodiment and the rib portion 48 or groove 47 shown in the fourth embodiment may be extended in the approaching direction and connected together. That is, if the irregularity portion is one which rectifies the flow of the abutted oil, it is not limited in shape, number, or a combination of them to the description of the first through the fifth embodiments.

What is claimed is:

1. A stator structure which is disposed between a turbine runner and a pump impeller of a torque converter, said stator structure comprising:

a plurality of circumferential vane portions for increasing torque which is input to an automatic transmission by employing reaction force produced when a flow of oil within said torque converter impinges on exterior surfaces of said vane portions in a stall state, each of said vane portions having a projection or a recession in a thickness direction of each of said vane portions for regulating the flow of oil impinging on it, said projection or said recession having a top or bottom flat portion and both side edges connected to the top or bottom flat portion and one of the exterior surfaces of said vane portions at their uppermost ends and lowermost ends at an obtuse angle.

2. The stator structure as set forth in claim 1, wherein said projection or said recession is a rib or a groove, respectively, extending near an exit portion of each of the vane portions substantially along the flow of the oil.

3. The stator structure as set forth in claim 1, wherein said projection or said recession curves to an outer portion of each of said vane portions near an exit portion of each of the vane portions.

4. The stator structure as set forth in claim 1, wherein each of said vane portions has another projection or recession extending near an inlet portion of each of the vane portions substantially along the flow of the oil.

5. The stator structure as set forth in claim 1, wherein said projection or said recession is a groove extending near an inlet portion of each of the vane portions substantially along the flow of the oil.

6. The stator structure as set forth in claim 1, wherein said projection or said recession is a groove extending near an exit portion of each of the vane portions substantially along the flow of the oil.

* * * * *